Figure 1:
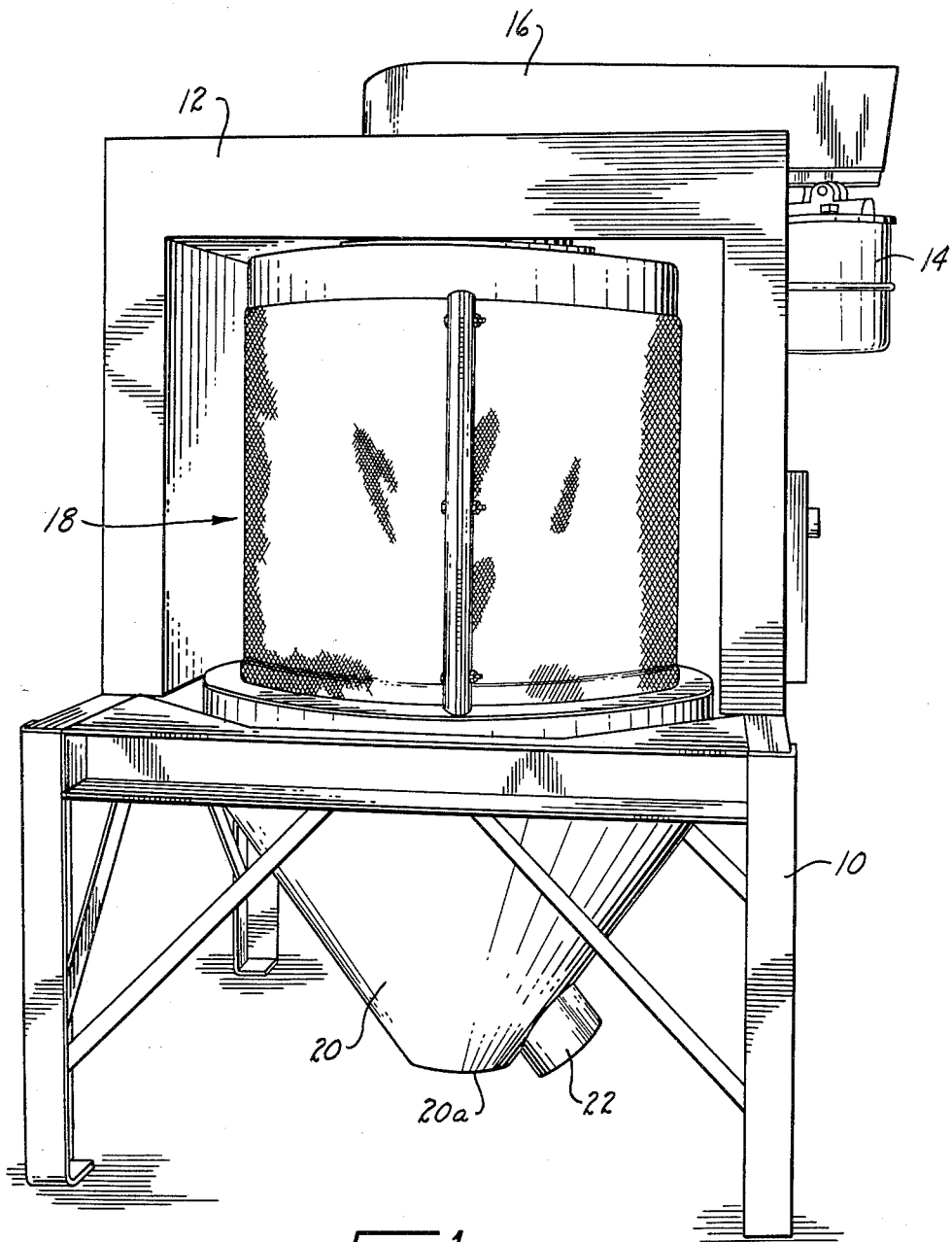

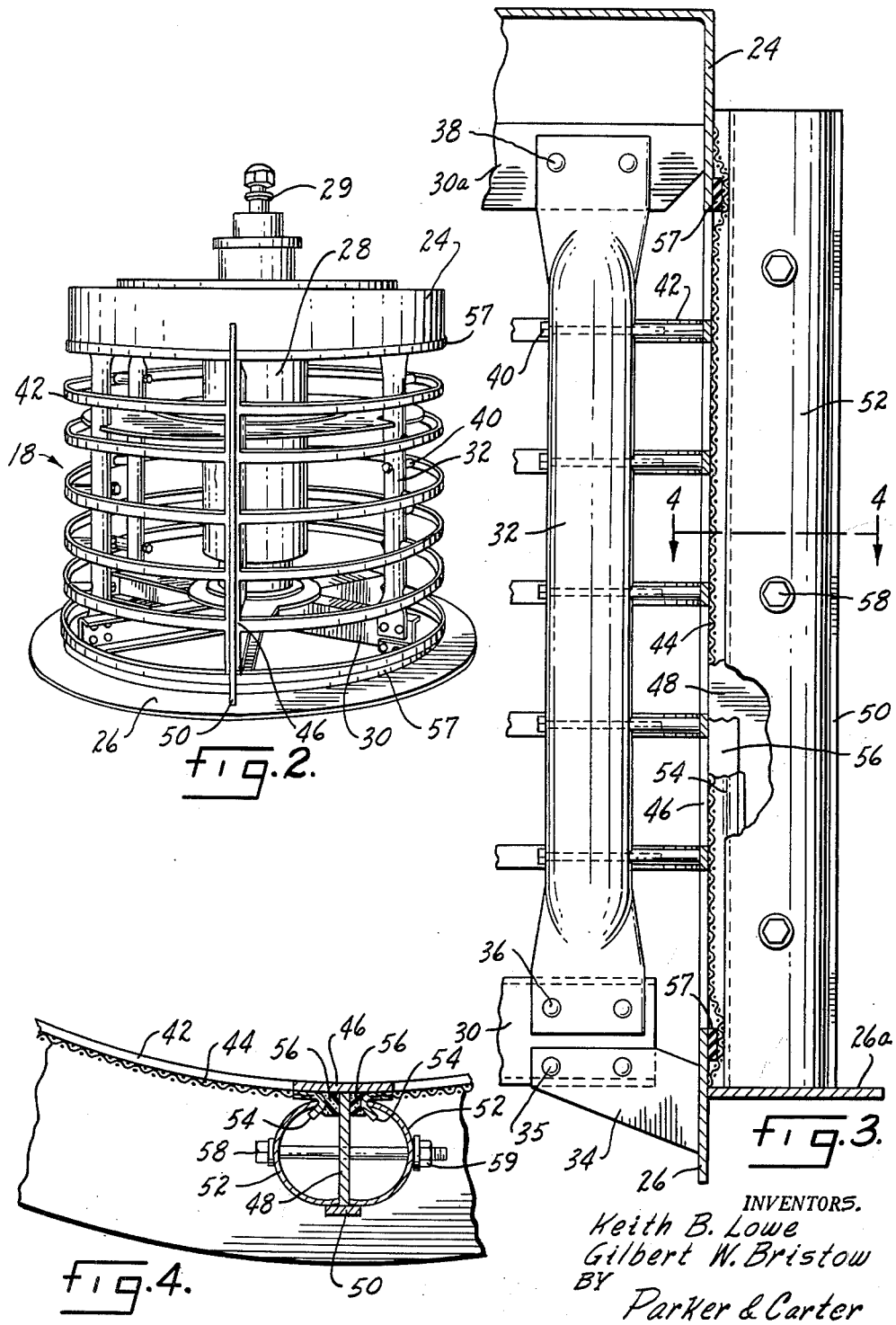

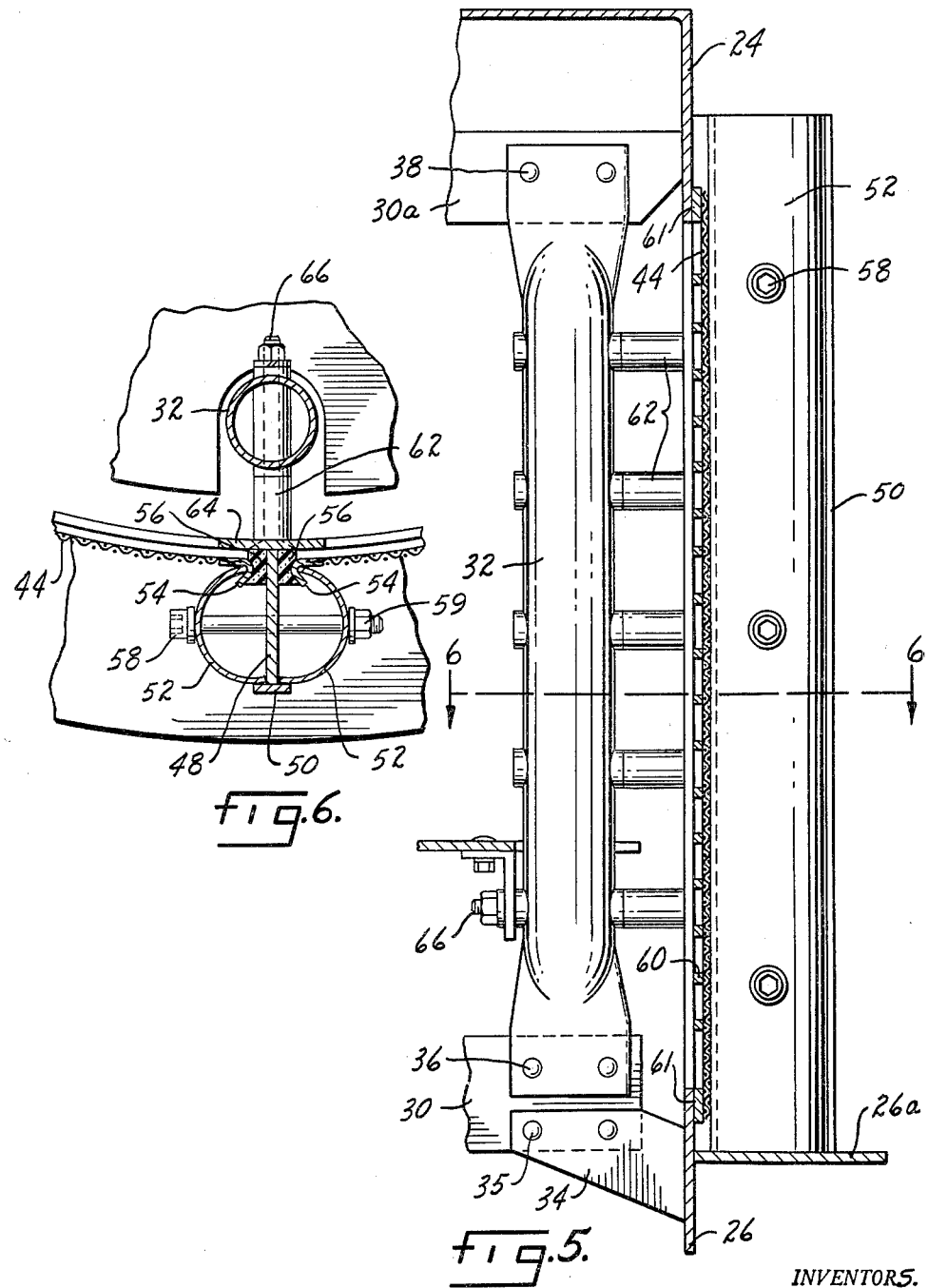

United States Patent Office 3,071,248
Patented Jan. 1, 1963

3,071,248
CLOTH ATTACHMENT FOR CYLINDRICAL SCREENS
Keith B. Lowe, West Allis, and Gilbert W. Bristow, Hales Corners, Wis., assignors to Nordberg Manufacturing Company, Milwaukee, Wis., a corporation of Wisconsin
Filed June 24, 1959, Ser. No. 822,579
3 Claims. (Cl. 209—406)

This invention relates to vertical axis screening devices, and more particularly to a means for securing screen mesh thereon.

One purpose of the present invention is to provide an improved means for securing screen mesh to the outer periphery of a rotatable screen structure.

Another purpose is to provide an improved means for securing and sealing a screen mesh to a rotatable screening structure.

Another purpose is to provide an improved means for tensioning a screen mesh on the outer periphery of a rotatable screening structure.

Another purpose is to provide an improved means for securing a screen mesh to a rotatable screening structure whereby the mesh has a longer useable life.

Another purpose is to provide an improved means for supporting and reinforcing a screen mesh on a screening structure having both rotary and gyratory motion.

Another purpose is a method, suitable for use in the factory and the field for replacing the screen mesh on a rotatable screening structure.

Other purposes will appear in the ensuing specification, drawings, and claims.

The invention is illustrated diagrammatically in the following drawings wherein:

FIGURE 1 is a perspective view of a vertical axis screening device with the outer cover removed, FIGURE 2 is a perspective view of a screening structure used in the screening device of FIGURE 1, with parts removed for clarity, FIGURE 3 is a vertical section through a portion of the structure of FIGURE 2 with parts cut away for clarity, FIGURE 4 is a section taken along line 4—4 of FIGURE 3, FIGURE 5 is a vertical section, similar to the section of FIGURE 3, showing a variant form, and FIGURE 6 is a section taken along line 6—6 of FIGURE 5.

In FIGURE 1, the screening device has a base structure 10 which supports an upper structure 12 upon which is mounted a suitable drive motor 14 and drive means 16. Positioned within the upper structure 12 is a screening structure indicated generally at 18 which has a hopper 20 and a discharge spout 22 extending outwardly through the lower portion thereof. The material to be screened is fed in at the upper end of the screening device, the screening device being not shown in detail. It has the generally cylindrical screen cloth or medium shown in FIGURES 3 and 4 and, with a different support, in FIGURES 5 and 6. The supporting structure, with the screen cloth, is simultaneously rotated about a vertical axis and gyrated. The material to be screened is centrifugally fed outwardly against the inner surface of the screen cloth. The undersize particles which pass outwardly through the screen cloth or medium are received by the hopper 20, whereas the particles which do not pass through the screen cloth move downwardly over the inner surface of the cloth and are collected in a smaller, inner hopper which may be similar to but is actually within the hopper 20. From this smaller, inner hopper these oversize particles are discharged through any suitable discharge spout, such as the one shown at 22. The particles received by the hopper 20 are discharged through its bottom opening 20a. The details of the screening device have not been shown and described herein as they are not essential to the invention. United States Letters Patent 2,500,965 describes a vertical axis screening device in detail.

The screening structure 18 is shown more particularly in FIGURE 2. The screening structure has an upper plate or cover 24 and a lower plate 26. Both the upper and lower plates are secured to a generally center rotor structure 28 by suitable angle irons or beams such as indicated at 30. 29 indicates the mounting structure for connecting the screening structure to the drive means. Each of the beams 30 have a vertical inner support member 32 secured to the bottom thereof, these support members also being secured to the top of the screening structure in like manner. FIGURE 3 shows the details of the assembly of the inner support members. The beams 30 are secured by rivets or the like 35 to plates 34 which are secured to the inner side or upright portion of the bottom plate 26. The inner upright support members 32 are secured by rivets or the like 36 to the members 30 and are secured by similar securing means 38 to upper support members 30a. The support members 32 are generally cylindrical in shape except near the upper and lower ends at which point the members are flattened so that they may be easily secured to the screening structure.

The members 32 have a plurality of spacers which are in the form of bolts 40, the outer ends of which support screen mesh support means in the form of rings 42. The screen mesh support rings have generally the same diameter as the upper and lower portions of the screening structure and are equally spaced between the bottom and top thereof. As shown in FIGURE 3, there is a bolt 40 for each ring 42 however it should be understood that not all the rings need be supported at the same member 32. For purposes of illustration all of the rings 42 are supported by the upright member 32 shown in FIGURE 3.

FIGURES 3 and 4 show the detail of the means by which the screen mesh 44 is secured to the screening structure. Lap backing strips 46 may be suitably secured, such as by welding, to the upper and lower plates 24, 26 at spaced points around the periphery of the screening structure. As shown in the drawings, I have secured the screen mesh 44 at two points around the periphery and therefore there are two lap backing strips 46. Welded to each of the lap backing strips 46 is a T section 48 positioned so that the head of the T is away from the screening structure. The bottom of the T sections are welded on their inner edge to bottom plate flange 26a and are secured at the upper edge to the top plate 24. Spaced on either side of the T section 48 is a semi-circular securing member 52, which may be a half pipe section. Each of the half pipe sections are placed against the T section with the outer edge placed inside the head 50 of the T. Although a semi-circular securing member is shown, it should be understood that this member may also be an angle iron, an I beam, or a similar structure. The important thing is that there be spaced edges which can be directed toward the T section. The inner edge of the half pipe sections has an edge 54 of the screen mesh 44 wrapped around it. This edge 54 forms a hook so that the screen mesh may be secured and tensioned around the periphery of the screening structure. The hook 54 may be part of the mesh or it may be a separate metal member secured to the mesh. Placed between the T section 48 and each hook 54 is an elongated strip 56 of a distortable material such as sponge rubber which is adapted to act as a seal. The half pipe sections with the screen mesh secured thereto are forced by means of bolts 58, which pass through both half pipe sections and through the T section, against the distortable sealing mmebers 56 so that the hooks and the screen mesh are secured and sealed to the structure. The bolt means 58 are tightened by nut 59 which is screwed inward and forces the half pipe sections together and compresses or distorts the rubber 56.

In order to seal the bottom and top of the screening structure, we have placed rubber strips 57 at the top and bottom of the lower and upper plates 24, 26. These rubber bands are cemented to the upper and lower plates and are placed inside the screen mesh 44. These bands will be distorted to some degree when the mesh is tightened so that there will be a seal at the top and the bottom of the screening structure.

A variant form of the invention is shown in FIGURES 5 and 6 in which parts common to both forms are indicated by like numbers. Instead of placing a plurality of spaced bands 42 to reinforce and support the screen mesh 44 there is a perforated plate 60 placed between the screen mesh and the inside of the screening structure. The perforated plate 60 is largely open, as is clearly shown in FIGURE 5, so that the screen mesh will not be blocked from the material being screened. As was true in the earlier form of the invention there are inner vertical supports 32 which are secured to the upper and lower plates 24, 26 of the screening structure. There are a plurality of spacers 62 spaced between the support members 32 and a lap backing strip 64 which is secured to the upper and lower plates 24, 26. The spacers 62 pass through the vertical supports 32 and are secured thereto by means of bolts 66. The spacers add additional support to the lap backing strips 64 to which the T sections are welded. In this form of the invention there are no rubber sealing strips between the screen mesh and the plates 24, 26, but instead the perforated plate, upon which the screen mesh is tensioned, is placed against the plates as at 61.

The screen mesh 44 is secured to the screening structure in the same manner as in the FIGURES 3 and 4 form. A pair of pipe halves or securing members 52 have their inner edges engaging a hook portion 54 of the screen mesh 44. The hook portions are adapted to be forced into elongated rubber strips 56 when nuts 59 are turned on bolts 58. This forces the hooks into the rubber and secures the screen mesh and tensions it on the perforated plate.

The use, operation and function of the invention are as follows:

Shown and described herein is an improved means for securing, tensioning and sealing a screen mesh to a rotating gyrating screening structure. In particular is shown a means and method for securing a screen mesh to the screening structure of a vertical axis screening device. In such a screening device the screening structure is both rotated and gyrated about a central axis so that the material to be screened is thrown against the screen mesh forming the outer periphery of the screening structure. In the operation of this device the material is periodically thrown against the screen mesh as it slowly moves toward the bottom of the screening device by force of gravity. The material to be screened is forced through the screen mesh to the outside into a suitable enclosure which holds the screened material. In any such screening device the upper and lower portions of the screening structure must be adequately sealed so that the material being screened will not leak out. Additionally the screen mesh must be adequately tensioned. If it is not tensioned, the material may clog the screen or blind it. One of the causes of blinding is inadequate tensioning of the screen mesh. Therefore shown and described herein is an improved means for sealing and tensioning a screen mesh on a screening structure.

The means and method shown herein may be used either in the factory or in the field. It would be used in the factory when a new screening machine or screen device was being manufactured. The method might be used in the field either to convert an existing screening device so that the tensioning means shown herein might be used or when the screen mesh is being replaced after it has become worn or blinded through use.

In order to seal the screening structure in one form of the invention, a pair of annular bands or rubber or some other distortable material have been placed around the circumference of the upper and lower plates between the plates and the screen mesh. These rubber bands are cemented or otherwise secured to the plates and are distorted or compressed by the force of the mesh as it is tensioned on the structure. These bands of rubber then seal the upper and lower portions of the screening structure. In the form of FIGURES 5 and 6, the perforated plate is positioned between the screen mesh and the upper and lower plates and so seals the upper and lower portions of the screening structure.

In order to tension the screen mesh on the screening structure it has been found that the screen mesh should be preferably divided into two portions. Each of these portions constitutes a half of the total screen mesh used to enclose the screening structure. When the screen mesh has been so divided there of necessity must be two securing points. Each of these securing points consists of a T section which is welded to a lap backing strip held in place on the screening structure. On each side of the T section is a half pipe section or similar member having spaced edges directed towards the T section, the outer edge being fitted within the head of the T so as to be braced thereby whereas the inner edge fits into a hook formed on the edge of the screen mesh. The inner edge then forces the hook into an elongated rubber strip which is placed against the T section. The bolts pass through both of the half pipe sections and through the T section. Tightening of these bolts causes the half pipe sections to move toward the T section and consequently causes the hooks to be forced into the rubber 56. This secures and tensions the screen mesh on the screening structure and seals the joint so that none of the material being screened will leak out.

The screen mesh may take a variety of forms, however, a steel cloth or steel mesh has been found to be satisfactory. There are various other types of screen mesh, however, which would be equally satisfactory providing they have a sufficient strength to withstand the force of the material being thrown against the mesh. The particular mesh used would depend on the particular operation and application of the screening device.

In order to use such a tensioned screen mesh as shown and described herein the mesh must be supported and reinformed between the upper and lower portions of the screening structure. Otherwise the mesh might be pulled in due to the tension. This distorts the screen such that the whole screen surface is not available for screening. In order to prevent this pulling in we have provided two methods of reinforcing and supporting the screen mesh. The mesh may be supported by a plurality of spaced bands or rings which are supported by vertical uprights and are spaced so that they are generally aligned with the outer circumference of the structure. The screen mesh is tensioned around the spaced bands. The second method of supporting the screen mesh is to use a perforated plate. This plate should be largely open so that the material being screened and sifted will not be obstructed thereby. The plate may be in two parts corresponding to the two portions of the screen mesh or the plate may be one continuous cylindrical plate. The important thing is that the plate be secured around the upper and lower peripheries of the screening structure so that it will adequately back and reinforce the screen mesh.

There are many modifications and alterations possible without depatring from the scope and spirit of the invention. For example, as shown herein, there are two securing points for the screen mesh. However, there may be one or there may be more than two securing points depending upon the size and application of the particular screening device. Additionally, the sealing members have been described as being generally of a cushion rubber or a sponge rubber, however, any distortable material would be equally satisfactory. The T sections used herein have been described as a continuous single member extending from the top plate to the bottom plate. It is equally satisfactory to divide the T section into a plurality of individual spaced sections which would each be welded to a lap backing strip.

The structure shown herein has been generally described in conjunction with a vertical axis screening device which has both rotational and gyratory movement. It should be understood that the invention is not limited thereto, but is equally applicable to other screening devices.

We claim:

1. In a screening device, a generally cylindrical rotating screen structure, a screen mesh secured around the outer periphery of said screen structure, a cylindrical support secured to said structure and positioned within said screen mesh so that said mesh may be tensioned thereon, at least two vertical supports secured to said screen structure and extending generally the height thereof, each of said vertical supports being T-shaped with the head of the T away from the screen structure, a generally semi-circular securing member having spaced, parallel and projecting edges positioned on opposite sides of each vertical support such that the edges are directed toward said support, each of said securing members extending generally the full height of said screen structure means for mounting said securing members to said vertical supports, an elastic seal member positioned along each side of each vertical support, said screen mesh edges being secured between the inner edge of each securing member and said seal members, the outer edges of said securing members being positioned inside of and abutting the head of the T.

2. The structure of claim 1 wherein said cylindrical support includes a plurality of cylindrical bands positioned at spaced intervals between the upper and lower portion of said screening structure.

3. The structure of claim 1 wherein said cylindrical support includes a cylindrical perforated plate positioned inside said screen mesh and secured to upper and lower portions of said screen structure.

References Cited in the file of this patent

UNITED STATES PATENTS

| | | |
|---|---|---|
| 309,216 | Forder | Dec. 16, 1884 |
| 964,144 | Chavanne | July 12, 1910 |
| 1,308,384 | Williams | July 1, 1919 |
| 2,225,909 | Gruender | Dec. 24, 1940 |
| 2,416,499 | Saxe | Feb. 25, 1947 |
| 2,500,965 | Symons | Mar. 21, 1950 |
| 2,804,208 | Hardefeld | Aug. 27, 1957 |
| 2,850,165 | Hesse | Sept. 2, 1958 |

FOREIGN PATENTS

| | | |
|---|---|---|
| 609,960 | Germany | Nov. 25, 1933 |
| 962,309 | Germany | Apr. 18, 1957 |